(12) United States Patent
Doyle et al.

(10) Patent No.: US 6,539,366 B1
(45) Date of Patent: Mar. 25, 2003

(54) CODEC WITH GENETIC ADAPTATION

(75) Inventors: Patrick F. Doyle, Hillsboro, OR (US); Burcin Aktan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/071,049

(22) Filed: Apr. 30, 1998

(51) Int. Cl.$^7$ ................................................. G06N 3/02
(52) U.S. Cl. ........................... 706/13; 706/13; 382/224; 382/9
(58) Field of Search ............................. 706/13; 382/224, 382/9

(56) References Cited

U.S. PATENT DOCUMENTS

| | | | |
|---|---|---|---|
| 5,651,099 A | * | 7/1997 | Konsella ........................ 706/13 |
| 5,864,832 A | * | 1/1999 | Meyers .......................... 706/13 |

OTHER PUBLICATIONS

Haykin, Simon, Neural Networks: A Comprehensive Foundation, IEEE Press, 1994, pp. 428–434, Jan. 1994.*
IEEE Standards Coordinating Comittee 10, Jane Radatz, Chair, The IEEE Standard Dictionary of Electrical and Electronics Terms, Sixth Edition, pp. 168, Jan. 1996.*
Mitchell, Melanie, An Introduction to Genetic Algorithms, The MIT Press, pp. 65–72, Jan. 1996.*
Soung C. Liew and Derek Chi–yin Tse; A control–theoretic approach to adapting VBR compressed video for transport over a CBR communication channel; IEEE/ACM Trans. Networking 6, 1 (Feb. 1998), pp. 42–55.*
Didier Le Gall; MPEG: a video compression standard for multimedia applications; Commun. ACM 34, 4 (Apr. 1991), pp. 46–58.*
Yuen–Hsien Tseng; Ja–Ling Wu; Constant–time neural decoders for some BCH codes Information Theory, 1994. Proceedings., 1994 IEEE International Symposium on 1994, p. 343, Jan. 1994.*

* cited by examiner

Primary Examiner—Wilbert L. Starks, Jr.
(74) Attorney, Agent, or Firm—Blakely, Sokoloff, Taylor & Zafman LLP

(57) ABSTRACT

A codec to compress information by generating a set of basis vectors based upon a population of vectors according to a pseudo-random sequence; and encoding the information into a set of coefficients indicative of a projection of the information onto the linear span of the set of basis vectors provided the projection satisfies a criterion of goodness. The generation of the basis vectors is based upon a genetic algorithm. To decode, the information is reconstructed or uncompressed by summing the set of basis vectors weighted by the set of coefficients.

36 Claims, 3 Drawing Sheets

CODEC WITH GENETIC ADAPTATION

FIELD OF INVENTION

The present invention relates to encoding or compressing information.

BACKGROUND

Compressing a signal or information vector involves representing the signal or information vector by less bits than is required to reproduce exactly the original signal or information vector. Often, compression involves the projection of the information vector upon a suitably chosen space, perhaps followed by quantization.

As an example, a discrete sequence with N components may be represented exactly by a weighted sum of N complex-valued discrete sinusoidal basis functions, the so-called Discrete Fourier Transform (DFT), where the weights are the DFT coefficients. If only a few of the DFT coefficients are relatively large in magnitude, then the original discrete sequence can be approximated by these large coefficients and setting the rest to zero. This is equivalent to a projection of the original sequence onto a space spanned by the sinusoidal basis functions corresponding to the large coefficients. Furthermore, these remaining DFT coefficients may be quantized, perhaps non-uniformly, where more bits are used to represent the larger (in magnitude) DFT coefficients than for the smaller (in magnitude) DFT coefficients.

It is common for digital images to be compressed according to algorithms standardized by the Joint Photographic Experts Group (JPEG). These algorithms utilize the so-called Discrete Cosine Transform (DCT) on block sizes of 8 by 8, where again the basis functions are sinusoidal in nature.

The DCT is popular because of its relatively simple computational complexity. However, better performance may be obtained by using the Karhunen-Loeve Transform (KLT). The coefficients used for expressing an information vector in terms of the basis functions for the KLT are uncorrelated, so that images with statistical correlation among its pixels can be accurately approximated (encoded or compressed) by the largest (in magnitude) KLT coefficients and their corresponding basis functions. The basis functions for the KLT are the eigenvectors of the autocorrelation matrix of the image to be compressed. However, this is computationally intensive, since both the autocorrelation matrix must be obtained (where it is assumed that the image is a stationary stochastic process during the time in which the auto-correlation matrix is estimated), and the eigenvectors of the matrix must be computed.

It is therefore desirable to obtain basis functions which provide compression similar to the KLT without its computational complexity.

DETAILED DESCRIPTION OF EMBODIMENTS

A codec is described for encoding (compressing) and decoding (reconstructing or uncompressing) information. The encoded or compressed information is expressed in terms of a set of coefficients representing the projection of the information upon a space spanned by a set of basis vectors. The basis vectors are derived according to a genetic algorithm. Genetic algorithms are iterative in nature, and can be efficiently implemented in hardware or software when compared to more computationally intensive algorithms such as a singular-value decomposition or a KLT, and yet can provide a richer set of basis vectors than the sinusoidal basis vectors used for the DCT.

Borrowing terminology from biology, the basis vectors will also be referred to as traits. The traits are obtained from a population in a pseudo-random nature, which allows the genetic algorithm to converge to a desirable set of basis vectors. Furthermore, past information is contained in genetic codes and dominant codes, so that the genetic algorithm can quickly adapt to new circumstances that are similar to past circumstances. For example, suppose a first image at some time $t_1$ is compressed, and a second image is compressed at a later time $t_2$ where the space spanned by the basis vectors for the second image is substantially different from the space spanned by the basis vectors for the first image. If now at time $t_3 > t_2 > t_1$ a third image similar to the first image is to be compressed, the population from which the traits (basis vectors) are derived "remembers" the basis vectors associated with the first image so that the genetic algorithm quickly provides a suitable set of basis vectors for image compression.

Figure 1:
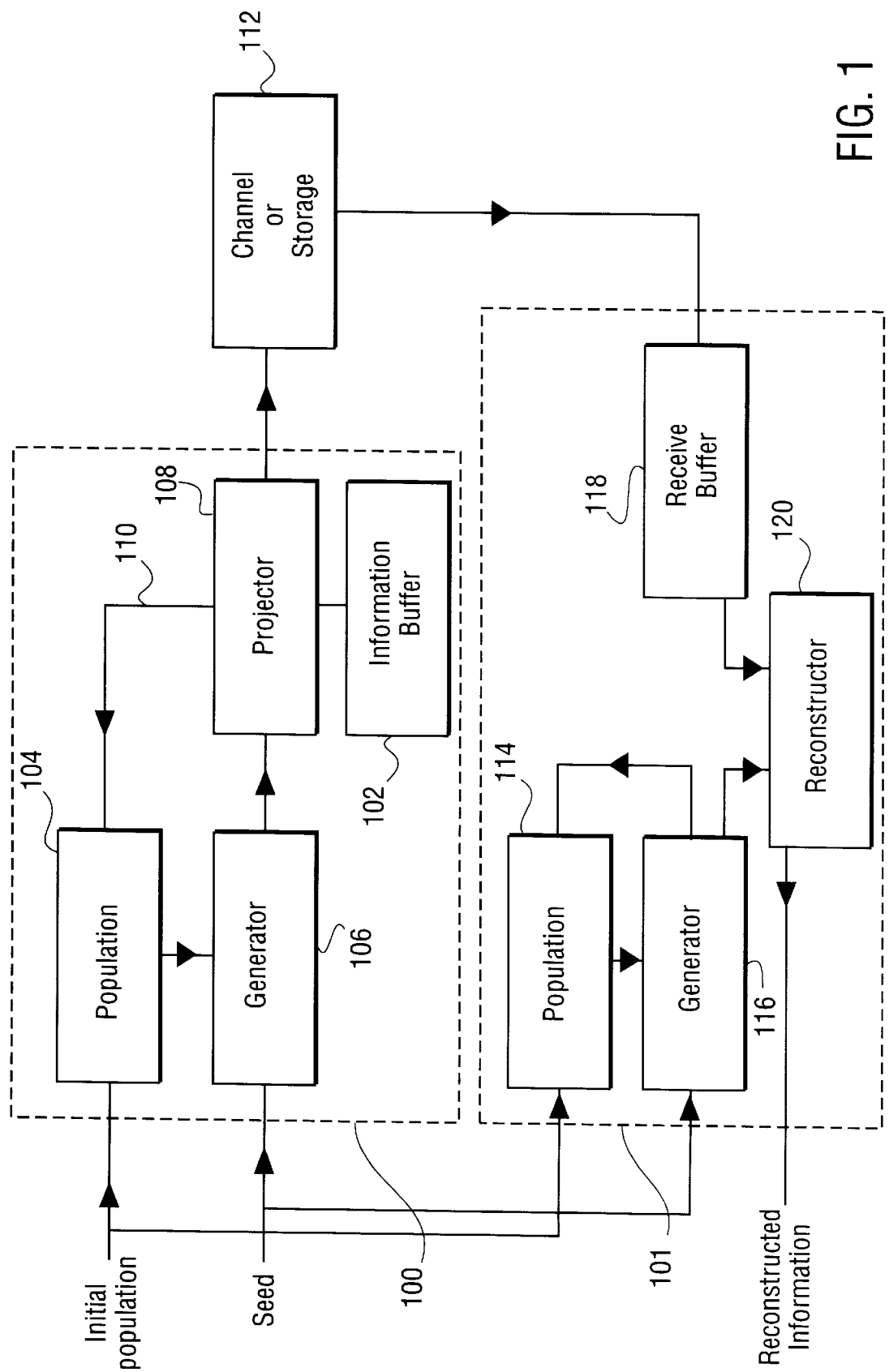
FIG. 1 is a functional diagram of a codec.

FIG. 1 is a functional diagram of a codec with encoder 100 for encoding information stored in information buffer 102 and with decoder 101 for decoding the encoded information. The codec maybe a video codec, in which case the information stored in buffer 102 is image data. However, the information to be encode may be of any kind. The codec of FIG. 1 maybe suitable for storing and retrieving compressed information from memory, or transmitting compressed information via a communication channel. This dual role is indicated by unit 112, which maybe a communication channel or a storage system.

Population buffer 104 stores a population of traits, along with their corresponding genetic codes. Basis vectors are chosen from all or some of the traits. Generator 106 generates a new set of traits and genetic codes based upon the population and a seed, from which a new set of basis vectors are obtained. Projector 108 projects the information stored in information buffer 102 onto the space spanned by the new basis vectors. Depending upon this projection, compression information may be obtained and provided to channel or storage unit 112. If not, the population in population buffer 104 is updated by the most recent set of traits and genetic codes, as indicated by path 110, and a new set of basis vectors is generated. When a suitable set of basis vectors is finally obtained, the set of coefficients representing the projection of the information upon this set of basis vectors, or a quantized version thereof, is provided to channel or storage unit 112.

Population buffer 114 and generator 116 of decoder 101 provide the same functions as population buffer 104 and generator 106, respectively. The same initial population and seed are provided to both encoder 100 and decoder 101. In this way, the population stored in population buffer 114 follows the same sequence as the population stored in population buffer 104, and the same set of basis vectors or traits are available to both encoder 100 and decoder 101. In this way, the basis vectors need not be transmitted or stored via channel or storage unit 112.

Consider a communication mode in which compressed information is transmitted from encoder 100 to decoder 101.

In one embodiment, encoder 100 and decoder 101 are synchronized so that when compression information is received by receive buffer 118, the most recent basis vectors generated by generator 116 are identical to that generated by generator 106. In another embodiment, encoder 100 provides information to decoder 101 regarding the number of iterations applied to population 104. This can be simply a sequence number, and its transmission consumes little bandwidth. Furthermore, there may be an agreed upon default set of basis vectors if the genetic algorithm is unable to find a suitable set of basis vectors within a predetermined number of iterations. For example, the JPEG protocol may be the default method of encoding. In this case, decoder 101 will know when the default method is employed if generator 116 exceeds the predetermined number of iterations, or encoder 100 may transmit a flag bit to decoder 101 to indicate that the default method is used. Clearly, more than one default method can be chosen and indicated to decoder 101 by encoder 100.

Once decoder 101 has determined the basis vectors, reconstructor 120 obtains the decoded or reconstructed information by performing a weighted sum of the basis vectors according to the received or retrieved set of coefficients stored in receive buffer 118. We now discuss the functional units in FIG. 1 in more detail, and provide more rigorous definitions.

We begin with notation. The so-called "bra-ket" notation will be used, where a (ket) vector is denoted by $|x>$ for some appropriate symbol x, and its dual (bra) vector (or complex conjugate transpose) is denoted by $<x|$. For example, a realization of a ket vector may be a column vector, in which case its dual is the row vector obtained by complex conjugating and transposing the column vector. A realization of a ket vector may be doubly indexed, which may be appropriate for representing two dimensional images. The inner product of $|y>$ and $|x>$ is $<x|y>$ or $<y|x>$, depending upon context (these two expressions are equal for real spaces). The particular physical realization of a vector is conveniently hidden by the bra-ket formalism.

Practical embodiments are limited to finite dimensional spaces, so that vectors may be thought as having a finite number of components. We denote the $i^{th}$ component of vector $|x>$ by $[|x>]_i$. Note that $[|x>]_i$ is a scalar, and it may belong to the complex field, the real field, or a finite field such as GF(2) (the Galois field of two elements). Furthermore, for notational simplicity, the index i may represent a composite index, i.e., two or more indices.

An individual is a set of at least one vector. In one embodiment, an individual is a set of four vectors $\{|x_1>, |x_2>, |x_3>, |x_4>\}$, where $|x_1>$ and $|x_2>$ are hidden genetic codes, $|x_3>$ is a dominant code, and $|x_4>$ is a trait. Other embodiments may have more or less genetic codes.

Figure 2:
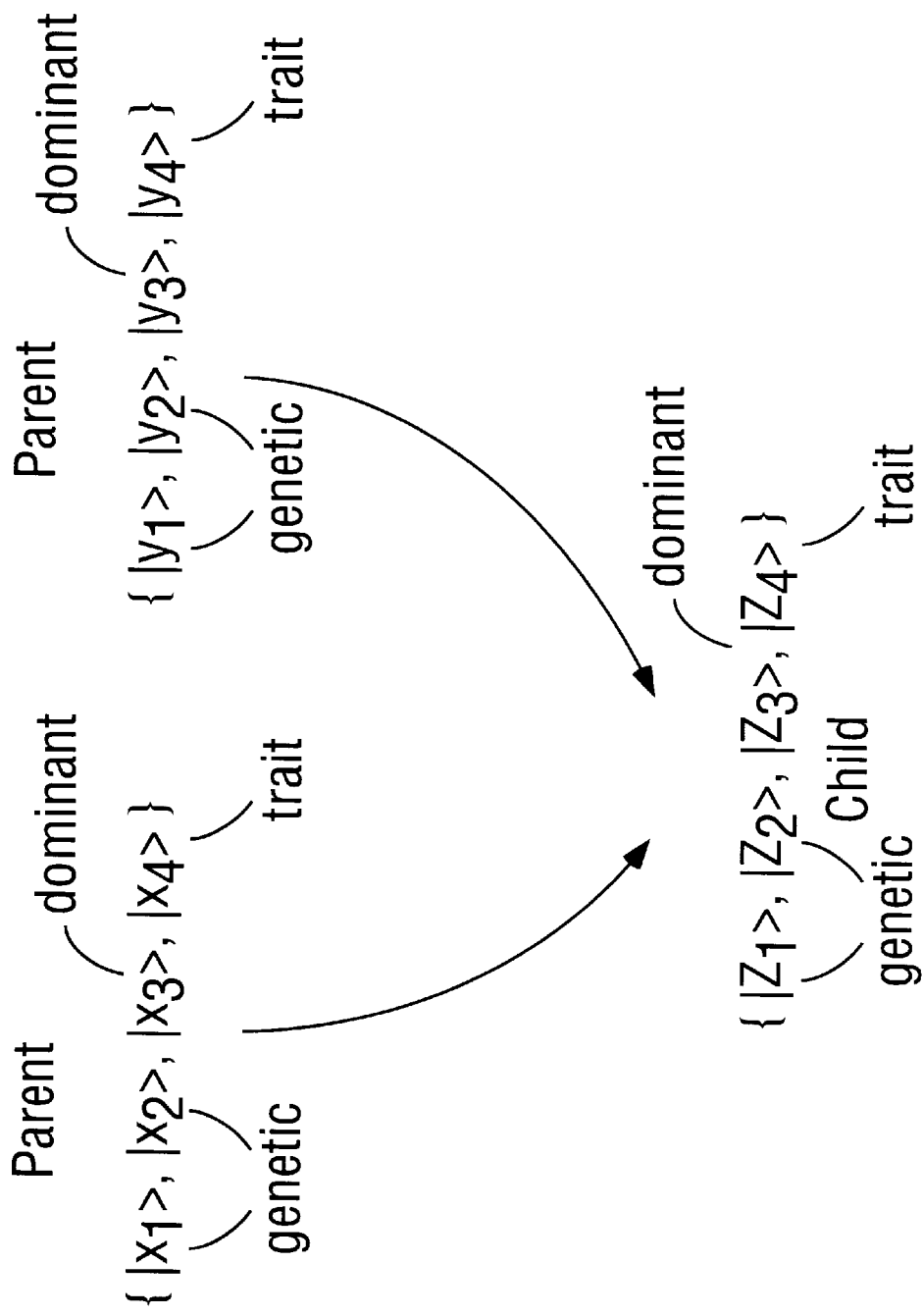
FIG. 2 illustrates an embodiment of two parents and a child.

A parent is an individual. A child is an individual obtained from two parents. (The parents may be identical.) FIG. 2 illustrates two parents, each a set of four vectors, from which a child, also a set of four vectors, is derived. The way in which a child is obtained from two parents is discussed in more detail later. A population is a set of one or more parents.

Generator 106 chooses two parents from population 104 and provides a child based upon these parents. This "choice" is governed according to a pseudo-random process (or sequence) in which some initial seed is provided. Basis generator 106 repeats this process, thereby generating a group of children for each iteration. In one embodiment, parents can only be used once to generate a child, whereas in another embodiment, this restriction is not provided. Furthermore, a child can be "promoted" immediately to a parent and stored in population 104 before the next child is generated, or, a group of children may first be derived before population 104 is updated. We now discuss how a child is generated.

Figure 3:
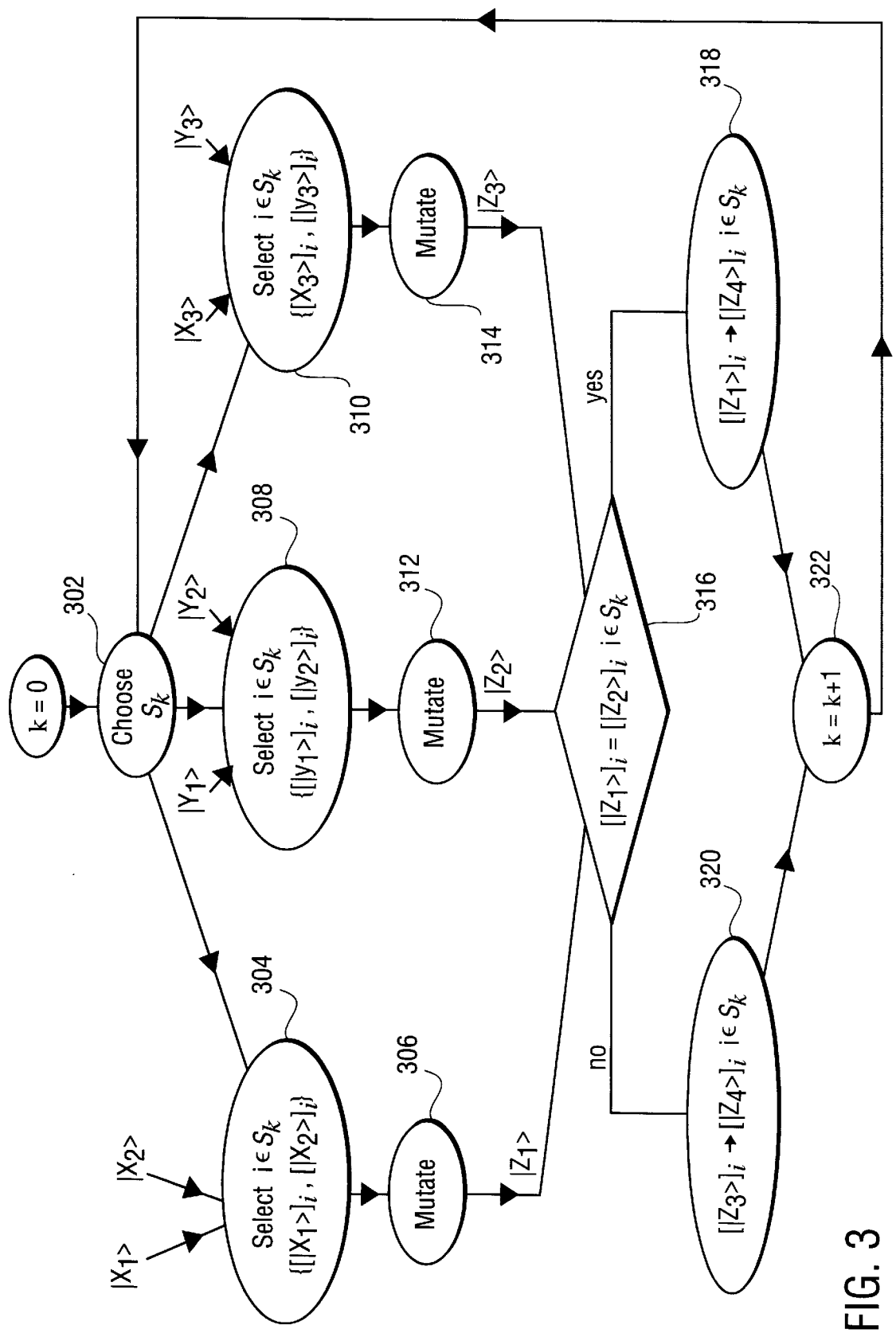
FIG. 3 is a flow diagram of an embodiment for deriving a child from two parents.

Let two parents be denoted by $\{|x_1>, |x_2>, |x_3>, |x_4>\}$ and $\{|y_1>, |y|y_4>\}$ as in FIG. 2. An embodiment for generating a child is illustrated in FIG. 3. In step 302, a finite set of integers $S_k$ is chosen. In one embodiment the set $S_k$ is a set of sequential integers. The set $S_k$ is indexed by k where $S_m \cap S_j = \{\phi\}$ for $m \neq j$ and such that the union of all $S_k$ is the set of integers delineating all the components of the vectors. A simple example of $S_k$ is $S_k = \{k\}$. However, we may have $S_k = \{nk, nk+1, \ldots, n(k+1)-1\}$. As another example, $S_k$ may be chosen according to a pseudo-random sequence.

In step 304, for $i \in S_k$ either $[|x_1>]_i$ or $[|x_2>]_i$ are selected. Once a selection is made, step 306 indicates the selection may be mutated according to a pseudo-random distribution. If mutated, a discrete pseudo-noise term is added. For example, if the vectors are binary so that the range of the vector components is GF(2), then a mutation simply changes a "0" to "1" and a "1" to "0". The result provided by step 306 is one of the genetic codes of the child, denoted as $|z_1>$. Steps 308 and 310 are similar to step 304 and steps 312 and 314 are similar to step 306 except the vectors operated upon are as indicated, yielding the other genetic code of the child, $|z_2>$, and the dominant code of the child, $|z_3>$.

In step 316, $[|z_1>]_i$ is compared to $[|z_2>]_i$ for $i \in S_k$. If they are equal, then in step 318 the trait components $[|z_4>]_i$ for $i \in S_k$ are given by $[|z_1>]_i$, whereas if not equal then in step 320 they are given by $[|z_3>]_i$. In step 322 k is incremented and control is brought back to step 302. Although not explicitly shown, the iterations stop when all vector components for the child have been obtained.

Once a group of children have been generated, a candidate set of basis vectors chosen from the traits of the children is tested to determine if it is a suitable basis set for encoding or compressing the information by projecting the information upon the space spanned by the candidate set of basis vectors. The bra-ket formulation is well suited for expressing the projection operator.

To this end, let $\{|u_i>, i=0, 1, \ldots N\}$ denote the candidate set of basis vectors where each $|u_i>$ is chosen from the traits of the children and let S denote the space spanned by this candidate set of basis vectors. That is, S is the linear span of $\{|u_i>, i=0, 1, \ldots N\}$. Many well-known techniques exist for finding a set of orthonormal basis vectors $\{|e_i>, i=0, 1, \ldots N\}$ spanning the space S. Note that if $\{|u_i>, i=0, 1, \ldots N\}$ is a linearly independent set, then n=N. Two such techniques are the well known Gram-Schmidt and Modified-Gram-Schmidt orthogonalization algorithms. From these algorithms, the orthonormal basis vectors can be expressed in terms of the candidate basis vectors to yield $$|e_i> = A_{ij}|u_j>,$$

where for notational simplicity we follow the convention used often in vector analysis that an index appearing more than once in an expression is summed over its appropriate range. For example, in the above displayed equation, the index j is summed from 0 to N.

Let $|v>$ denote the information to be compressed. The (orthogonal) projection operator P of a vector onto S is given by $P = |e_i><e_i|$, where the implied sum over i is from 0 to n.

The orthogonal projection of the information onto S is given by $$Pv=<e_i|v>|e_i>.$$

Using the first displayed equation for $|e_i>$ in the above displayed equation yields the projection of the information onto S in terms of the candidate basis set.

$$|v>=\alpha_j|u_j>, \alpha_j=A_{ij}<e_i|v|.$$

In one embodiment, the coefficients $\alpha_j$ determine whether the candidate basis vectors are the basis vectors used for encoding the information. This decision may be based upon the distribution of $\alpha_j$. For example, one method is to choose the candidate basis set if $\alpha_j<T$ for $j>J$, where T is a threshold and $J \leq N$. If the candidate basis set is chosen, then the coefficients $\alpha_j$ for $j \leq J$ are transmitted or stored by encoder 100. In another embodiment, this threshold method is applied to the coefficients $<e_i|v>$, and the coefficients $<e_i|v>$ are transmitted, it being understood that the basis vectors are now the orthonormal basis vectors $|e_i>$.

However, the set of coefficients associated with the projection of the information may first be quantized, in which case the quantized set of coefficients are transmitted or stored. This quantization need not be uniform. That is, more bits may be used to represent an $\alpha_j$ than that used for an $\alpha_k$, where $j<k$. In this case, the transmitted or stored set of coefficients are indicative of but not identical to the set of coefficients obtained by the projection operator.

In another embodiment, the candidate basis vectors are chosen if the norm of the orthogonal complement of the projection of the information upon S is below some threshold. That is, $$<v-Pv|v-Pv><\epsilon.$$

Clearly, other criteria of goodness may be employed to determine if the candidate basis vectors are chosen as the basis vectors for encoding the information.

To decode or reconstruct the compressed image, decoder 101 simply reconstructs the information based upon the transmitted coefficients and basis vectors. For example, if the method is used where $\alpha_j$ for $j \leq J$ has been transmitted, then the reconstructed information vector, denoted by $|v_e>$, is given by $|v_e>=\alpha_j|u_j>$ where the summation over the index j is from 0 to J.

Combinations of the above-described functional units in FIG. 1 and embodiments maybe implemented in hardware or software.

In deriving children from parents, more than one pseudo-random sequence may be utilized for the selection and mutation processes. Furthermore, different pseudo-random sequences may be used for different children. Without loss of generality, one may group these pseudo-random sequences into a set of pseudo-random sequences. We then say that a child is derived from parents according to this set of pseudo-random sequences if the derivation is based upon at least one pseudo-random sequence belonging to this set of pseudo-random sequences.

The population may be updated by the children in various ways. For example, an age index may be associated with each member of the population and incremented each time a new group of children is derived. When this age index exceeds a threshold, the parent is removed from the population.

Various modifications can be made to the embodiments described above without departing from the scope of the invention as claimed below.

What is claimed is:

1. A storage device comprising a computer readable medium, wherein the computer readable medium has stored therein instructions to cause a computer system to perform a method, the method comprising:
   generating a set of basis vectors based upon a population of vectors according to at least one pseudo-random sequence; and
   encoding an information vector into a set of coefficients indicative of an orthogonal projection of the information vector onto the linear span of the set of basis vectors provided the orthogonal projection satisfies a criterion of goodness.

2. The storage device as set forth in claim 1, the method further comprising updating the population of vectors with the set of basis vectors if the orthogonal projection does not satisfy the criterion of goodness.

3. The storage device as set forth in claim 2, the method further comprising reconstructing a decoded information vector based upon the set of coefficients and the set of basis vectors.

4. The storage device as set forth in claim 1, the method further comprising reconstructing a decoded information vector based upon the set of coefficients and the set of basis vectors.

5. The storage device as set forth in claim 1, wherein the population of vectors comprises a plurality of sets of vectors, each set of vectors belonging to the population of vectors defining a parent.

6. The storage device as set forth in claim 5, wherein in generating the set of basis vectors, each basis vector is derived from two parents.

7. The storage device as set forth in claim 6, the method further comprising updating the population of vectors with the set of basis vectors if the orthogonal projection does not satisfy the criterion of goodness.

8. The storage device as set forth in claim 7, the method further comprising reconstructing a decoded information vector based upon the set of coefficients and the set of basis vectors.

9. The storage device as set forth in claim 6, the method further comprising reconstructing a decoded information vector based upon the set of coefficients and the set of basis vectors.

10. The storage device as set forth in claim 6, wherein each parent comprises:
    a trait vector;
    a dominant vector;
    a first genetic vector; and
    a second genetic vector.

11. The storage device as set forth in claim 10, wherein in generating the set of basis vectors the method further comprises:
    generating a set of vectors derived from a first parent and a second parent to define a child, the child comprising a trait vector, a dominant vector, a first genetic vector, and a second genetic vector; wherein:
      the first genetic vector of the child is derived from the first and second genetic vectors of the first parent according to the at least one pseudo-random sequence;
      the second genetic vector of the child is derived from the first and second genetic vectors of the second parent according to the at least one pseudo-random sequence;
      the dominant genetic vector of the child is derived from the dominant genetic vectors of the first and second parents according to the at least one pseudo-random sequence;

components of the trait vector of the child are set equal to corresponding components of the first genetic vector of the child if corresponding components of the first and second genetic vectors of the child are equal to each other; and components of the trait vector of the child are set equal to corresponding components of the dominant vector of the child if corresponding components of the first and second genetic vectors of the child are not equal to each other; wherein the trait vector of the child belongs to the set of basis vectors.

12. The storage device as set forth in claim 11, the method further comprising updating the population of vectors with the set of basis vectors if the orthogonal projection does not satisfy the criterion of goodness.

13. The storage device as set forth in claim 12, the method further comprising reconstructing a decoded information vector based upon the set of coefficients and the set of basis vectors.

14. The storage device as set forth in claim 11, the method further comprising reconstructing a decoded information vector based upon the set of coefficients and the set of basis vectors.

15. A storage device comprising a computer readable medium, wherein the computer readable medium has stored therein instructions to cause a computer system to perform a method, the method comprising:

generating a set of basis vectors based upon a population of vectors according to at least one pseudo-random sequence; and projecting orthogonally an information vector onto the linear span of the set of basis vectors.

16. The storage device as set forth in claim 15, the method further comprising updating the population of vectors with the set of basis vectors if the orthogonal projection of the information vector does not satisfy a criterion of goodness.

17. The storage device as set forth in claim 16, the method further comprising reconstructing a decoded information vector based upon the orthogonal projection of the information vector.

18. The storage device as set forth in claim 15, the method further comprising reconstructing a decoded information vector based upon the orthogonal projection of the information vector.

19. The storage device as set forth in claim 15, wherein the population of vectors comprises a plurality of sets of vectors, each set of vectors belonging to the population of vectors defining a parent.

20. The storage device as set forth in claim 19, wherein in generating the set of basis vectors, each basis vector is derived from two parents.

21. The storage device as set forth in claim 20, the method further comprising updating the population of vectors with the set of basis vectors if the orthogonal projection does not satisfy a criterion of goodness.

22. The storage device as set forth in claim 21, the method further comprising reconstructing a decoded information vector based upon the orthogonal projection of the information vector.

23. The storage device as set forth in claim 20, the method further comprising reconstructing a decoded information vector based upon the orthogonal projection of the information vector.

24. The storage device as set forth in claim 20, wherein each parent comprises:

a trait vector;

a dominant vector;

a first genetic vector; and a second genetic vector.

25. The storage device as set forth in claim 24, wherein in generating the set of basis vectors the method further comprises:

generating a set of vectors derived from a first parent and a second parent to define a child, the child comprising a trait vector, a dominant vector, a first genetic vector, and a second genetic vector; wherein:

the first genetic vector of the child is derived from the first and second genetic vectors of the first parent according to the at least one pseudo-random sequence;

the second genetic vector of the child is derived from the first and second genetic vectors of the second parent according to the at least one pseudo-random sequence;

the dominant genetic vector of the child is derived from the dominant genetic vectors of the first and second parents according to the at least one pseudo-random sequence;

components of the trait vector of the child are set equal to corresponding components of the first genetic vector of the child if corresponding components of the first and second genetic vectors of the child are equal to each other; and components of the trait vector of the child are set equal to corresponding components of the dominant vector of the child if corresponding components of the first and second genetic vectors of the child are not equal to each other; wherein the trait vector of the child belongs to the set of basis vectors.

26. The storage device as set forth in claim 25, the method further comprising updating the population of vectors with the set of basis vectors if the orthogonal projection does not satisfy a criterion of goodness.

27. The storage device as set forth in claim 26, the method further comprising reconstructing a decoded information vector based upon the orthogonal projection of the information vector.

28. The storage device as set forth in claim 25, the method further comprising reconstructing a decoded information vector based upon the orthogonal projection of the information vector.

29. A storage device with a program code stored therein to program a computer system to perform a method, the method comprising:

generating a set of basis vectors based upon a population of vectors according to at least one pseudo-random sequence;

receiving a set of coefficients; and generating a reconstructed information vector by summing the set of basis vectors weighted by the set of coefficients.

30. The storage device as set forth in claim 29, wherein the population of vectors comprises a plurality of sets of vectors, each set of vectors belonging to the population of vectors defining a parent.

31. The storage device as set forth in claim 30, wherein in generating the set of basis vectors, each basis vector is derived from two parents.

32. The storage device as set forth in claim 31, wherein each parent comprises:

a trait vector, a dominant vector;

a first genetic vector; and a second genetic vector.

33. The storage device as set forth in claim 32, wherein in generating the set of basis vectors the method further comprises:

generating a set of vectors derived from a first parent and a second parent to define a child, the child comprising a trait vector, a dominant vector, a first genetic vector, and a second genetic vector; wherein:

the first genetic vector of the child is derived from the first and second genetic vectors of the first parent according to the at least one pseudo-random sequence;

the second genetic vector of the child is derived from the first and second genetic vectors of the second parent according to the at least one pseudo-random sequence;

the dominant genetic vector of the child is derived from the dominant genetic vectors of the first and second parents according to the at least one pseudo-random sequence;

components of the trait vector of the child are set equal to corresponding components of the first genetic vector of the child if corresponding components of the first and second genetic vectors of the child are equal to each other; and components of the trait vector of the child are set equal to corresponding components of the dominant vector of the child if corresponding components of the first and second genetic vectors of the child are not equal to each other; wherein the trait vector of the child belongs to the set of basis vectors.

34. A method for encoding and decoding a signal represented by an information vector, the method comprising:

generating a set of basis vectors based upon a population of vectors according to at least one pseudo-random sequence;

encoding the signal into a set of coefficients indicative of an orthogonal projection of the information vector onto the linear span of the set of basis vectors; and decoding the signal by summing the set of basis vectors weighted by the set of coefficients.

35. The method as set forth in claim 34, wherein the population of vectors comprises a plurality of sets of vectors, each set of vectors belonging to the population of vectors defining a parent; wherein in generating the set of basis vectors, each basis vector is derived from two parents.

36. The method as set forth in claim 35, wherein each parent comprises:

a trait vector;

a dominant vector;

a first genetic vector; and a second genetic vector;

wherein in generating the set of basis vectors the method further comprises:

generating a set of vectors derived from a first parent and a second parent to define a child, the child comprising a trait vector, a dominant vector, a first genetic vector, and a second genetic vector; wherein:

the first genetic vector of the child is derived from the first and second genetic vectors of the first parent according to the at least one pseudo-random sequence;

the second genetic vector of the child is derived from the first and second genetic vectors of the second parent according to the at least one pseudo-random sequence;

the dominant genetic vector of the child is derived from the dominant genetic vectors of the first and second parents according to the at least one pseudo-random sequence;

components of the trait vector of the child are set equal to corresponding components of the first genetic vector of the child if corresponding components of the first and second genetic vectors of the child are equal to each other; and components of the trait vector of the child are set equal to corresponding components of the dominant vector of the child if corresponding components of the first and second genetic vectors of the child are not equal to each other; wherein the trait vector of the child belongs to the set of basis vectors.

* * * * *

UNITED STATES PATENT AND TRADEMARK OFFICE
CERTIFICATE OF CORRECTION

PATENT NO. : 6,539,366 B1
DATED : March 25, 2003
INVENTOR(S) : Doyle et al.

It is certified that error appears in the above-identified patent and that said Letters Patent is hereby corrected as shown below:

Column 2,
Line 33, delete "encode", insert -- encoded --.
Line 34, delete "maybe", insert -- may be --.

Signed and Sealed this

Thirtieth Day of September, 2003

JAMES E. ROGAN
*Director of the United States Patent and Trademark Office*